United States Patent [19]

Craig et al.

[11] Patent Number: 4,815,782
[45] Date of Patent: Mar. 28, 1989

[54] GRAPPLING DEVICE

[75] Inventors: Preston S. Craig; Jeffrey A. Fisher, both of Huntsville, Ala.

[73] Assignee: United Technologies Corporation, Hartford, Conn.

[21] Appl. No.: 938,947

[22] Filed: Dec. 8, 1986

[51] Int. Cl.⁴ .......................... B25J 15/00; B66C 1/46
[52] U.S. Cl. ................................ 294/119.3; 294/63.2; 294/98.1
[58] Field of Search ...................... 294/119.3, 93, 98.1, 294/63.2, 86.24, 88; 623/57, 64, 65, 66

[56] References Cited

U.S. PATENT DOCUMENTS 3,574,386  4/1971  Frost ............................... 296/119.3
3,601,442  8/1976  Orndorff, Jr. .................... 294/119.3
3,981,528  9/1976  Andorf et al. ................... 294/119.3

Primary Examiner—James B. Marbert

[57] ABSTRACT

A grappling device comprises an arm formed from a closed ended, inflatable tube (5) having a plurality of generally parallel, longitudinally spaced bands (15) disposed therearound for limiting the radial distention of the arm when inflated. A longitudinally inelastic, laterally flexible band (20) disposed on a surface of the arm causes the arm, when inflated, to wrap around an object to be gripped. The extent of the inflation of the arm determines the gripping force and geometry of the device.

8 Claims, 2 Drawing Sheets

GRAPPLING DEVICE

DESCRIPTION

1. Technical Field

This invention relates generally to grappling devices and in particular to a grappling device suitable for use in outer space.

2. Background Art

Among the principal functions performed by the crew of a space shuttle orbiter, are the release and retrieval (for maintenance, repair or the like) of satellites for communication and observation. Shuttle orbiters are typically provided with mechanical manipulators provided with grippers at the ends thereof which engage mating fixtures on the satellites for transporting the satellite to and from the shuttle cargo bay. While precise engagement of the manipulator's gripper with a fixture on the satellite may not be difficult to achieve when the satellite is at rest in the orbiter's cargo bay, retrieving an orbiting satellite, especially one in rotation about a central axis thereof, is extremely difficult if not impossible without extravehicular, human intervention to terminate satellite rotation and align the gripper with the fixture on the satellite. Of course, such extravehicular activity involves undesirable risks and an inefficient consumption of the crew's time.

In future shuttle orbiter missions, manipulators will be required to manipulate objects of diverse size and shape. For example, in the construction of space structures and in the launching of large satellites and other space vehicles, the arms will be required to exert tremendous amounts of force in grasping and moving generally unwieldy apparatus. On the other hand, in launching and retrieving small satellites and performing other delicate extravehicular functions on other small, lightweight objects, the manipulators must be capable of gentle gripping and precisely manipulating the objects. For convenience and economy, a single gripper (grappling device) for such manipulators, capable of handling objects of diverse size and weight is, of course, desirable. However, due to size and weight constraints placed upon apparatus employable in space vehicles, for optimal utility, such a grappling device should be of minimal volume and weight.

DISCLOSURE OF INVENTION

Accordingly, it is a principal object of the present invention to provide an improved grappling device for use in manipulators, which grappling device is capable of both gripping and manipulating objects of diverse size and weight without the necessity of specialized components or fixtures on the objects handled thereby.

It is another object of the present invention to provide such a grappling device which is capable of both gripping and terminating the rotation of objects such as satellites and the like without human intervention.

It is another object of the present invention to provide such a grappling device which is light in weight and compact in size.

In accordance with the present invention, these and various other objects are satisfied by a grappling device comprising an inflatable arm which is longitudinally elongatable when inflated, and a first means on the arm for limiting such straight, longitudinal elongation and causing the free end of the arm to grip an object to be manipulated by wrapping therearound. Accordingly, specialized gripping fixtures on either the object or a manipulator on which the grappling device is used, are unnecessary for a sure, positive gripping of the object. In accordance with one aspect of the present invention, the means for limiting the longitudinal elongation of the arm and causing the arm to wrap around the object, comprises a longitudinally inelastic, laterally flexible band extending along a surface of the arm whereby inflation of the arm beyond the point of straight arm extension, causes the arm to assume a somewhat helical shape with the band oriented along the inner surface of the helix. Bidirectional wrapping of the arm may be achieved by division of the arm into two longitudinally parallel cells joined at a wall portion to which the longitudinally inelastic band is attached, select inflation of one of the cells determining the direction of wrap. For multidirectional wrapping, a plurality of such bands may be employed around the lateral surface of the arm wherein restraint of one of the bands causes the arm to wrap helically in a direction whereby the restrained band is disposed along the interior of the helix. Preferably, the arm is provided with second means for limiting the radial distention of the arm as the arm is inflated for enhancing the longitudinal elongation of the arm under such conditions and for tailoring the curvature and gripping force of the inflated arm. This second means may comprise a plurality of longitudinally spaced inelastic bands disposed about the lateral surface of the arm.

In an alternate embodiment of the present invention, the arm and the first means for causing the arm to wrap around an object, when inflated, comprise a pair of generally parallel, individually inflatable and longitudinally extendable cells joined along a common wall portion thereof. The direction and force of the arm wrap is determinable by the relative pressures at which the individual cells are inflated.

BEST MODE FOR CARRYING OUT THE INVENTION AND INDUSTRIAL APPLICABILITY THEREOF

Figure 1:
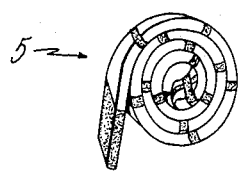
FIG. 1 is a perspective view of a first embodiment of the grappling device of the present invention in a stowed configuration.
Figure 2:
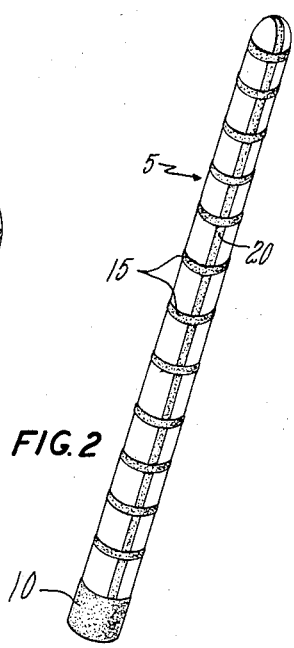
FIG. 2 is a perspective view of the grappling device in a straight, longitudinally extended configuration.
Figure 3:
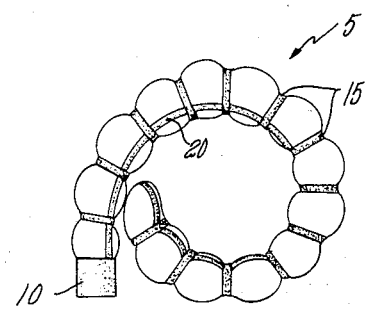
FIG. 3 is a side elevation of the grappling device in a gripping configuration.
Figure 4:
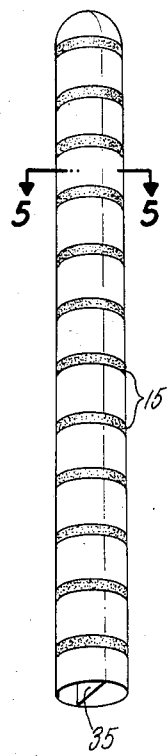
FIG. 4 is a perspective view of an alternate embodiment of the grappling device of the present invention.
Figure 5:
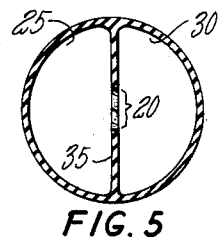
FIG. 5 is a sectional view taken in the direction of line 5—5 of FIG. 4.

Referring to FIGS. 1-3, a first embodiment of the grappling device of the present invention includes an inflatable arm 5 comprising a closed ended, elastic tube formed from synthetic rubber or a similar material. The tube is provided at the open end (base) thereof with a cuff 10 for connecting the arm to supporting structure such as a mechanical manipulator or apparatus for inflating the arm. The arm is provided on the lateral surface thereof with a plurality of longitudinally, spaced first flexible bands 15 which limit the radial distention of the arm as the arm is inflated, whereby inflation of the tube results in essentially longitudinal growth with only limited radial distension. The spacing of bands 15 will be determined by the materials employed in the grappling device, the desired geometry of the device in a gripping configuration and the desired gripping force. For example, decreasing radial band spacing toward the tip of the arm tightens the gripping configuration and increases the gripping force while increasing radial band spacing will have the opposite effect. Arm 5 is also provided on the lateral surface thereof with a longitudinally inelastic, laterally flexible band 20 which extends from cuff 10 to the end of the arm. Band 20 may be formed from such materials as an aromatic polyamide or the like in a cord, ribbon or similar elongate form.

As illustrated in FIG. 1, the grappling device may be rolled up and compactly stowed in a deflated condition. In use, the grappling device is inflated whereupon, as shown in FIG. 2, the device is unrolled and assumes a generally straight configuration. Further inflation beyond that which straightens the device, causes the device to curl into a helix in the manner illustrated in FIG. 3, such that band 20 lies along the inner surface of the helix. It will be readily apparent that in use, when the device is inflated to a straight configuration and positioned adjacent to an object to be gripped, further inflation of the device will cause the device to wrap around the object for the secure engagement thereof without the requirements of interfacing hardware on the object. As shown in FIG. 3, when inflated to a helical configuration, the device will conform precisely to a cylindrical object although the flexibility and resilience of the inflated elastic arm enable the arm to conform sufficiently to numerous other diverse shapes for the secure gripping thereof. It will also be noted that attachment of the device to an object by wrapping therearound enables the grappling device to stop rotation of the object about a central axis thereof simultaneously with engagement of the object. Accordingly, such rotational objects can be simultaneously stopped and gripped by the device without human intervention which, in outer space, would require crew activity outside the vehicle on which the device is used. Furthermore, since the amount of curl or gripping force is proportional to the amount of inflation of the arm, the grappling device of the present invention is equally well suited for manipulating both large, heavy objects and small, lightweight objects since the gripping force and helical wrap geometry may be conveniently controlled by controlling the amount of arm inflation. Still further, the grappling device is extremely compact, being stowable in the rolled configuration illustrated in FIG. 1 and is extremely light in weight, thereby rendering it ideally suited for use under the size and weight constraints imposed in space vehicles.

Figure 7:
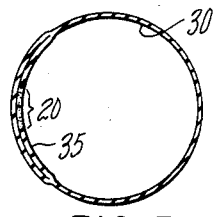
FIG. 7 is a sectional view taken in the direction of line 7—7 of FIG. 6.
Figure 6:
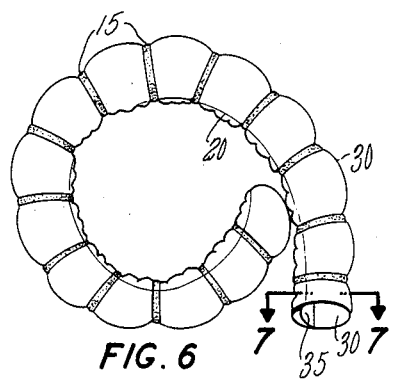
FIG. 6 is a side elevation of the grappling device of FIG. 4 in a gripping configuration.
Figure 8:
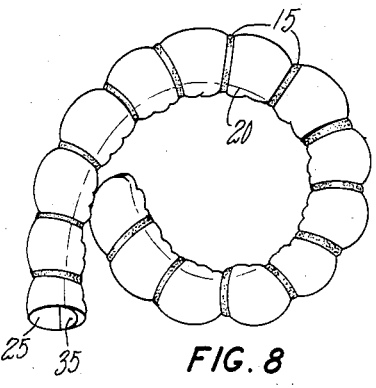
FIG. 8 is a view similar to FIG. 6 but showing the grappling device in a gripping configuration opposite to that shown in FIG. 6.

Referring to FIGS. 4 through 8, an alternate embodiment of the present invention is shown. In this embodiment, the elastic arm comprises first and second generally parallel individually inflatable cells 25 and 30 joined along a common wall portion 35. Longitudinally inelastic and laterally flexible band 20 is disposed along wall portion 35 (either integrally therewith or fixed on surface thereof). The arm also includes longitudinally spaced circumferential bands 15 as described hereinabove. As best seen in FIGS. 6 and 7, in this embodiment, the grappling device is capable of bidirectional gripping depending upon which of the cells is inflated. As illustrated in FIG. 7, when cell 30 is inflated, wall portion 35 is forced to the left and the device curls in a counterclockwise (as viewed in FIG. 6) direction, with band 20 oriented along the interior of the helix. Likewise, if only cell 25 is inflated, band 20 is urged to the right (as viewed in FIG. 8) and the device curls in a clockwise direction (as viewed in FIG. 8).

Figure 9:
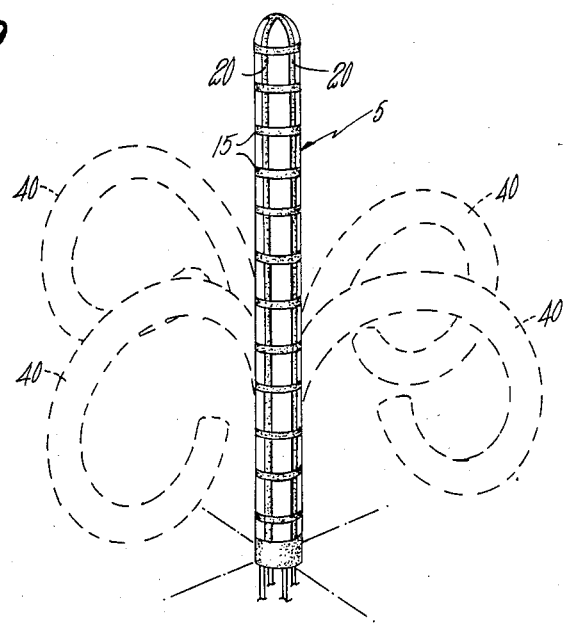
FIG. 9 is a perspective view of a third embodiment of the present invention.

Referring to FIG. 9, a second alternate embodiment is shown, this grappling device being capable of multidirectional gripping as indicated by phantom lines 40. In this embodiment, arm 5 is of the same general configuration as that illustrated in FIG. 2 and comprises a single, closed elastic tube inflatable from cuff 10 thereof and includes spaced circumferential bands 15 to limit radial distention. However, a number of longitudinally extending, circumferentially spaced bands 20 (unattached to bands 15) are also provided. In use, the direction of gripping (wrap) is controlled by controlling the longitudinal restraint of bands 20 from the ends thereof adjacent cuff 10. Longitudinal restraint of the free end of a single band will cause the arm to curl in a direction corresponding to orientation of the restrained band along the interior surface of the inflated helix, the remaining bands being allowed to move longitudinally with the longitudinal growth of the arm. While four bands and hence, generally four directions of gripping are illustrated in FIG. 9, it will be appreciated that greater or lesser numbers of bands and hence directions of gripping may be provided.

Figure 10:
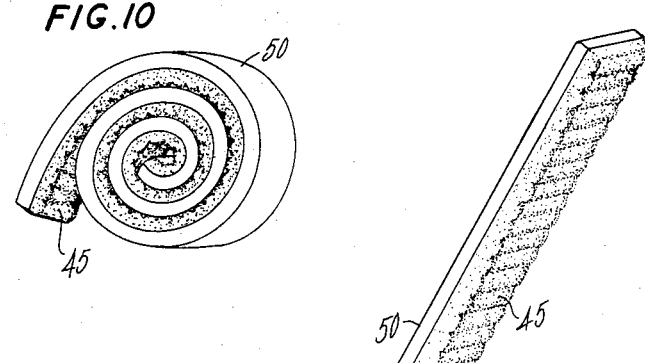
FIG. 10 is a perspective view of a fourth embodiment of the grappling device of the present invention, shown in a stowed configuration.
Figure 11:
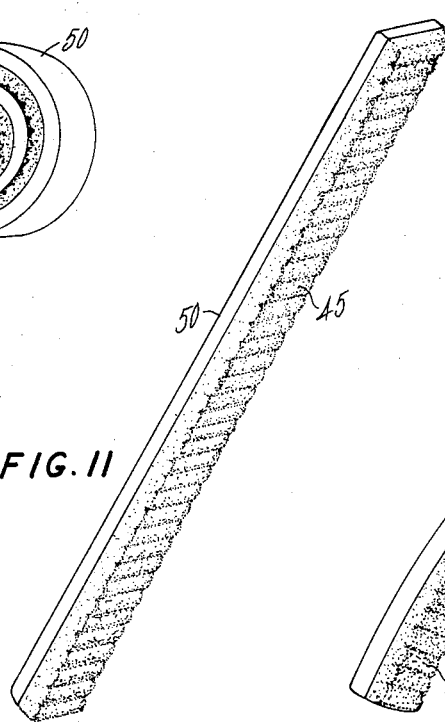
FIG. 11 is a perspective view of the grappling device of FIG. 10 in a straight, longitudinally extended configuration.
Figure 12:
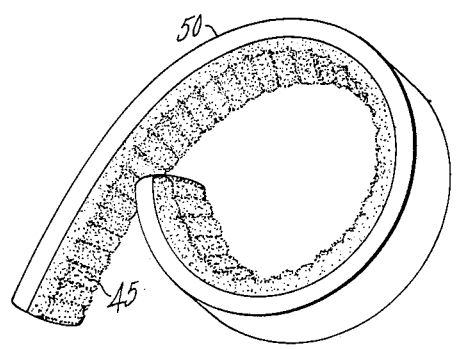
FIG. 12 is a perspective view of the grappling device shown in FIGS. 10 and 11, in a gripping configuration.

Referring to FIGS. 10 through 12, a third alternate embodiment is shown. In this embodiment, the arm comprises an inelastic inflatable cell 45 having a rippled gripping surface and band 20 is replaced by a second inelastic inflatable cell 50 generally longitudinally coextensive with the first cell and connected thereto along a common interior wall portion (not shown) similar to wall portion 35 in FIG. 5, but formed instead of an inelastic material. As best seen in FIG. 11, equal inflation of both cells 45 and 50 straightens the device from the rolled (stowed) configuration of FIG. 10.

By inflating one of the cells more than the other, the device is made to wrap around the object to be gripped, assuming the configuration illustrated in FIG. 12. The greater the pressure difference between the two cells, the greater the gripping force (tighter the wrap) applied to the object by the grappling device.

The salient features of the present invention set forth with respect to the embodiment shown in FIGS. 1 through 3 apply to the alternate embodiment as well. That is, all are light in weight, compactly stowed and are capable of gripping an object with varying degrees of force. Furthermore, since all grip an object by means of wrapping therearound, none require specialized interfacing hardware on the object to be gripped and therefore when employed in a space vehicle, will not require human assistance in the alignment of the device with an object to be manipulated. Furthermore, all are ideally suited for stopping the rotation of an object about a central axis thereof without human assistance.

While particular embodiments of the present invention have been illustrated and described, it will be appreciated that various modifications may be made to the apparatus shown and described without departing from the present invention. It is the intent of the following claims to cover all such modifications as fall within the true spirit and scope of the invention herein.

Having thus described the invention, what is claimed is:

1. A grappling device characterized by:
   an inflatable arm, said inflatable arm being longitudinally elongatable when inflated;
   first means disposed on a surface of said inflatable arm for both limiting the straight, longitudinal elongation of said arm and for causing said arm to wrap around an object to be gripped when said arm is inflated beyond a predetermined amount
   second means for limiting the radial distension of said arm, thereby enhancing the longitudinal elongation of said arm as said arm is inflated, and
   third means for selecting one of a number of directions of wrap of said arm as said arm is inflated.

2. The grappling device of claim 1 characterized by said inflatable arm being elastic.

3. The grappling device of claim 1 characterized by said second means comprising a plurality of longitudinally spaced, first inelastic bands, each disposed around the lateral surface of said arm.

4. The grappling device of claim 1 characterized by said first means comprising a longitudinally, inelastic, lateral flexible second band extending along said surface of said arm, longitudinally thereof.

5. The grappling device of claim 1 characterized by said third means comprising a plurality of longitudinally inelastic, laterally flexible bands circumferentially spaced around the lateral surface of said arm parallel to the longitudinal axis thereof and movable thereover as said arm is inflated, the direction of said wrapping being determinable by the select longitudinal restraint of at least one of said longitudinally inelastic, laterally flexible bands as said arm is inflated.

6. The grappling device of claim 4 characterized by:
   said third means comprising an individually inflatable and longitudinaly extendable cell joined to said arm along a wall portion thereof, generally parallel thereto;
   said second means comprising a longitudinally, inelastic flexible band being disposed along said wall portion;
   the direction of wrapping of said arm being determinable by the select inflation of either said arm or said cell.

7. The grappling device of claim 1 characterized by said inflatable arm being inelastic.

8. The grappling device of claim 7 characterized by said inflatable arm comprising a first inflatable cell and said first means comprising a second inflatable cell, generally longitudinally coextensive with said first cell and connected thereto along a common interior wall portion;
   the extent of longitudinal elongation and direction of wrapping of said grappling device around said object, being determined by the control of the relative pressures at which said first and second cells are inflated.

* * * * *